United States Patent [19]

Harada

[11] Patent Number: 4,579,295

[45] Date of Patent: Apr. 1, 1986

[54] BRAKE MECHANISM FOR TAPE CASSETTE

[75] Inventor: Masayuki Harada, Tokyo, Japan

[73] Assignee: Sony Corporation, Tokyo, Japan

[21] Appl. No.: 678,474

[22] Filed: Dec. 5, 1984

[30] Foreign Application Priority Data

Dec. 20, 1983 [JP]  Japan ............................ 58-195862[U]

[51] Int. Cl.[4] ................................................ G03B 1/04
[52] U.S. Cl. ..................................... 242/198; 360/132
[58] Field of Search ................................ 242/197–200, 242/204; 360/132, 137

[56] References Cited

U.S. PATENT DOCUMENTS 4,210,296 7/1980 Frechette ............................ 242/198
4,232,840 11/1980 Sugawara ............................ 242/198
4,513,929 4/1985 Oishi et al. ........................ 242/198

Primary Examiner—Leonard D. Christian
Attorney, Agent, or Firm—Lewis H. Eslinger; Alvin Sinderbrand

[57] ABSTRACT

A brake mechanism for a pair of reels of a tape cassette includes a base member slidable in a guideway in a direction extending between the pair of reels. A pair of stopper members or arms are hinged on the base member and extend away therefrom for engaging teeth on flanges of the reels. The base block includes a spring hold pin to which is anchored a spring which urges the stopper members towards the teeth to lock the reels in position.

7 Claims, 8 Drawing Figures

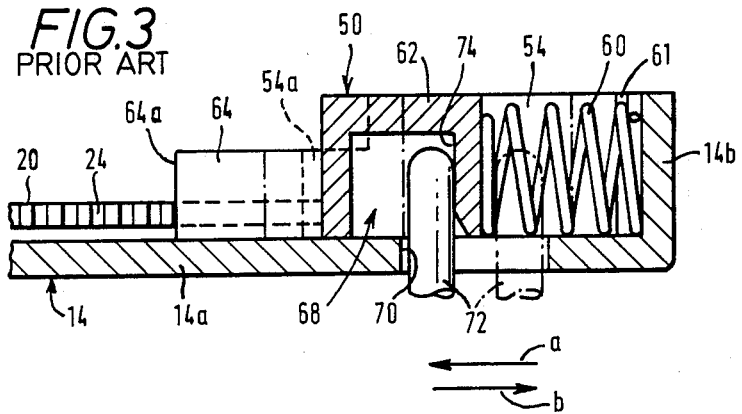
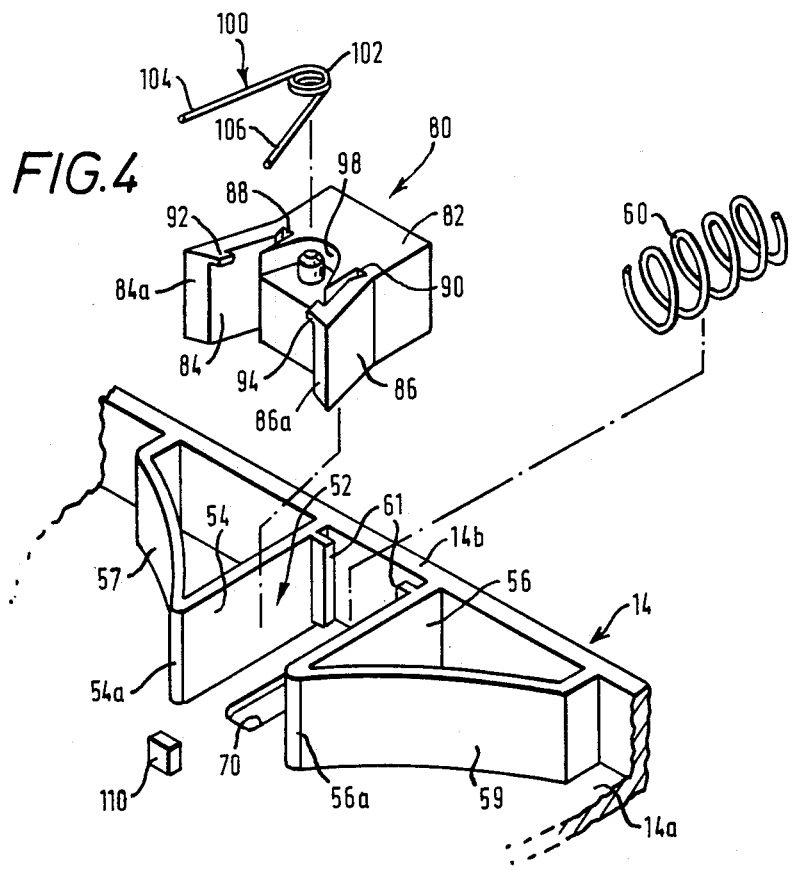

BRAKE MECHANISM FOR TAPE CASSETTE

BACKGROUND OF THE INVENTION

1. Field of the Invention

This invention relates to brake mechanisms for tape cassettes, for example magnetic tape cassettes for recording video and/or audio and/or other information.

2. Description of the Prior Art

FIGS. 1 to 3 of the accompanying drawings show a previously proposed 8 mm video tape cassette that comprises a cassette housing 10 having an upper half or portion 12 and a lower half or portion 14. Reels 16, 18 are rotatably mounted on the lower housing portion 14. The reels 16, 18 have upper flanges (not shown in the drawings for the sake of clarity) and lower or bottom flanges 20, 22. The flanges 20, 22 have teeth 24, 26 formed around their outer peripheries. The lower housing portion 14 is provided with reel drive openings 28, 30 to enable the hubs 32, 34 of the reels 16, 18 to be engaged by reel drive means of a recording and/or reproducing apparatus (not shown). A magnetic tape 36, wound on the reels 16, 18, is entrained around guide portions 38, 40 of the lower housing portion 14 to follow the path shown in FIG. 1. When the cassette is installed in the recording and/or reproducing apparatus, a front lid or cover 42 hingedly fitted to the upper housing portion 12 is pivoted upwardly of the cassette housing 10 to allow access to the run of the tape 36 extending between the guide portions 38, 40 by tape engagement means (not shown) that can enter the cassette housing 10 through an opening 44 in the lower housing portion 14. The upper housing portion 12 is provided with an opening 46 covered by a hingedly mounted member 48.

When the cassette is not in an operative position in the recording and/or reproducing apparatus, the reels 16, 18 are locked in position by a brake or lock mechanism which includes a reel stopper 50 mounted for sliding movement within a guideway 52. The guideway 52 is defined by a bottom wall 14a and a rear wall 14b of the lower housing portion 14 and by ribs or guide walls 54, 56. The axis of the guideway 52 extends between the reels 16, 18 so that the reel stopper is slidable in a direction extending between the reels, 16, 18. As can best be seen from FIG. 2, the ribs or guide walls 54, 56, together with ribs 57, 59, can be formed integrally with the lower housing portion 14.

A coil spring 60, which is secured by members 61 to the base of the guideway 52 (i.e. the lower end of the guideway as viewed in FIG. 2), acts between the base of the guideway and the reel stopper 50 so as to bias the reel stopper toward a locking position, shown by solid lines in FIG. 2, in which the reel stopper is adjacent the mouth of the guideway (i.e. the upper end of the guideway as viewed in FIG. 2), and in which the brake mechanism locks the reels 16, 18 in position. The locking position is defined by a tapered end portion of a base block or member 62 of the reel stopper abutting against the free ends or tips 54a, 56a of the guide walls 54, 56, which are correspondingly inclined inwardly towards one another.

The reel stopper 50 includes a pair of stopper members or arms 64, 66 fitted to the base block 62. Each stopper member 64, 66 is in the form of a thin, resiliently deformable (flexible) blade or leaf and is formed simultaneously with the base block 62 by resin injection molding. The stopper members 64, 66 are configured and oriented with precision so that, when the reel stopper 50 is in the above-mentioned locking position, the tips or free ends 64a, 66a of the stopper members engage the teeth 24, 26 of the lower flanges 20, 22 of the reels 16, 18, as shown by the upper solid line positions of the stopper members in FIG. 2, to lock the reels in position.

As can be seen from FIG. 3, the base block 62 of the reel stopper 50 is provided with a hollow 68 which is accessible by way of a slot or cutout 70 in the bottom wall 14a of the lower housing portion 14. When the cassette is installed in the recording and/or reproducing apparatus and the tape 36 is to be released for transport, a lock release pin 72 of the apparatus is inserted into the hollow 68 via the slot 70. The pin 72 is moved in the direction of an arrow b (FIGS. 2 and 3) and engages a wall 74 of the hollow 68 in the base block. As the pin 72 moves in the direction of the arrow b from the position shown in FIG. 3 in full lines to that shown by chain-dotted lines, the base block 62 is correspondingly moved away from its locking position (shown by full lines in FIG. 2) toward the base of the guideway 52, and against the action of the coil spring 60, to a release position shown by chain-dotted lines in FIG. 2. During the course of this movement, the stopper members 64, 66 (which, of course, move together with the base block 62) are resiliently deformed toward one another by virtue of their engaging tips or end portions 54a, 56a of the ribs or guide walls 54, 56. The relative orientation of the stopper members 64, 66 thus changes from the splayed apart orientation shown by the upper solid lines in FIG. 2 to the somewhat relatively inwardly bowed configuration shown by the lower solid lines in FIG. 2. During the release movement, whose stroke is shown at l in FIG. 2, the tips or free ends 64a, 66a of the stopper members 64, 66 come out of engagement with the teeth 24, 26 of the lower flanges 20, 22 of the reels 16, 18 whereby the reels are unlocked and the tape 36 can be transported for recording and/or reproduction.

When the reels 16, 18 are again to be locked, the lock release pin 72 is moved in the direction represented by an arrow a in FIGS. 2 and 3, as a result of which the reel stopper 50 is urged by the coil spring 60 back into its locking position in which the tips or free ends 64a, 66a of the stopper members 64, 66 engage the teeth 24, 26 of the lower flanges 20, 22 of the reels 16, 18 to lock the reels in position.

The above-described brake or lock mechanism is subject to two disadvantages. First, since the stopper members 64, 66 are quite thin, if one or both of the reels 16, 18 is forcibly rotated, when locked in position, in directions represented by arrows c and d in FIG. 2, the stopper members can become bent, as shown by chain-dotted lines in FIG. 2. In the worst case, the stopper members 64, 66 can even be broken. Second, as the reel stopper 50 slides over the limited stroke represented by the arrow l in FIG. 2 to unlock the reels 16, 18, in order to guarantee complete release of the stopper members from the teeth 24, 26 the stopper members are forced to flex toward one another, as explained above, by engagement of the stopper members with the tips or free ends 54a, 56a of the ribs 54, 56. Since, as noted above, the stopper members 54, 56 are thin, they tend to become deformed to such an extent that their opening angle (i.e. their relative orientation) departs from the precise value determined in manufacture by the injection molding operation, whereby the reel stopper may eventually fail to function to lock the reels 16, 18.

SUMMARY OF THE INVENTION

An object of the present invention is to provide a brake mechanism for a tape cassette which overcomes or at least alleviates the disadvantages of the above-described previously proposed brake mechanism.

Another object of the present invention is to provide a brake mechanism for a tape cassette which minimizes the possibility of stopper members thereof becoming bent or broken if the reels are forcedly rotated when locked in position.

A further object of the present invention is to provide a brake mechanism for a tape cassette which minimizes the possibility of stopper members thereof becoming so deformed that they fail to lock the reels.

The present invention provides a brake mechanism for a tape cassette having a cassette housing and a pair of tape reels on which a recording tape is wound, each tape reel being provided with a flange having teeth on an outer periphery thereof. The brake mechanism comprises a base member slidable in a direction extending between the pair of tape reels, a spring hold pin provided on the base member, a pair of stopper members hinged on the base member and extending away from the base member for arbitrarily engaging with the teeth of the flanges for braking purposes, and a spring anchored at the spring hold pin of the base member for urging the pair of stopper members toward the teeth of the flanges. In the present invention, the stopper members do not have to be resiliently deformable, i.e. they do not have to be elastic. They can therefore be made sufficiently thick to reduce or even eliminate the possibility of their being bent or even broken by forced rotation of the reels. Further, since the stopper members are urged into engagement with the teeth by the spring, there is no need to precisely determine the angle of opening (i.e. the relative orientation) of the stopper members during manufacture.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 is a sectional view taken along a line III—III in FIG. 2;

FIG. 4 is an exploded perspective view of a tape cassette reel brake or lock mechanism embodying the present invention;

DESCRIPTION OF THE PREFERRED EMBODIMENTS

Figure 1:
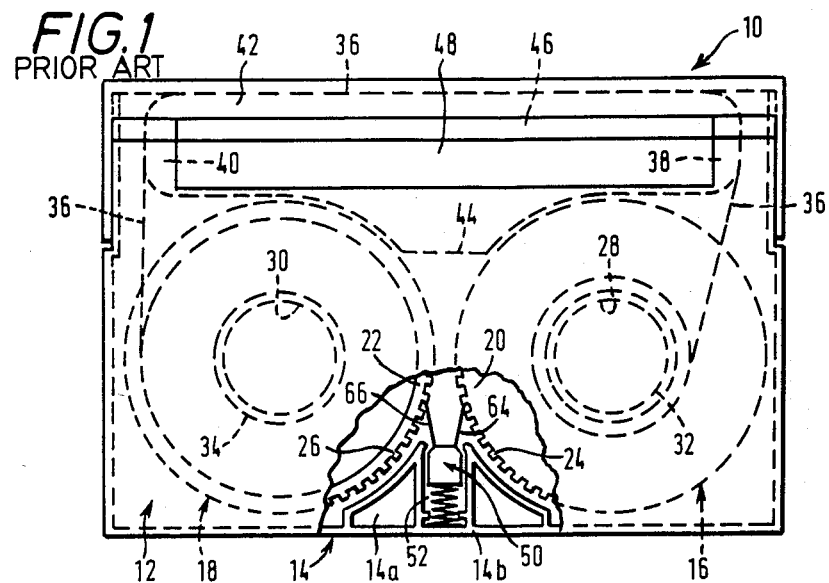
FIG. 1 is a plan view of a tape cassette with part of an upper housing portion thereof broken away to show a previously proposed brake or lock mechanism for a pair of reels of the cassette.
Figure 2:
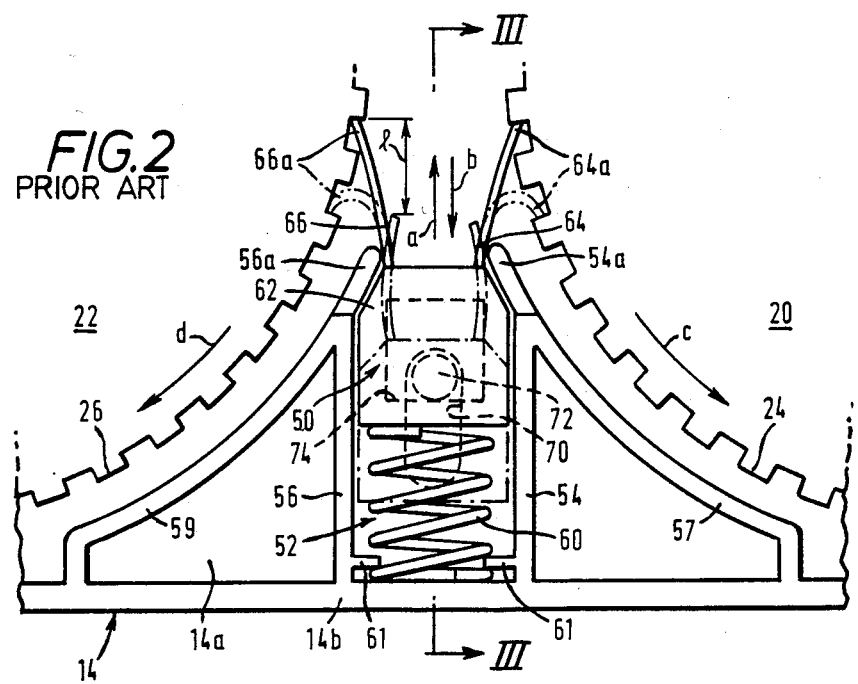
FIG. 2 is a plan view, corresponding to FIG. 1, showing the reel brake mechanism on a larger scale.

A tape cassette incorporating a previously proposed reel brake or lock mechanism was described in detail above with reference to FIGS. 1 to 3. A reel brake or lock mechanism embodying the present invention will now be described with reference to FIGS. 4 to 8. The mechanism of FIGS. 4 to 8 is fitted to a cassette which is similar to that described with reference to FIG. 1. Also, the brake mechanism of FIGS. 4 to 8 includes some components which are in substance the same as like components of the brake mechanism of FIGS. 1 to 3. Therefore, in the interests of clarity and brevity, the mechanism of FIGS. 4 to 8 will largely be described only in so far as it differs from that of FIGS. 1 to 3. In particular, items in FIGS. 4 to 8 corresponding to like items in FIGS. 1 to 3 are identified by the same references and their description will not be repeated below.

The reel brake or lock mechanism of FIGS. 4 to 8 comprises a reel stopper 80 which is slidable in a guideway 52 similar to the guideway 52 in FIGS. 1 to 3. The reel stipper 80 comprises a base block or member 82 of synthetic resin which has a pair of stopper members or arms 84, 86 formed integrally therewith by injection molding and extending away from respective sides of the base block 82. The stopper members 84, 86 are thick relative to the stopper members 64, 66 of FIGS. 1 to 3. Also instead of being precisely configured and oriented with respect to the base block 82 and being resiliently deformable (elastic), the stopper members 84, 86 are substantially non-elastic (i.e. they are substantially rigid) and are hinged with respect to the base block 82 by virtue of their being formed with thin portions 88, 90 at their roots, i.e. at their ends joined to the base block, as can best be seen from FIG. 8. Thus, as is perhaps best evident from FIG. 8, the stopper members 84, 86 are freely hingeable with respect to the base block.

The free ends or tips 84a, 86a of the stopper members 84, 86 are chamfered to assist in their engagement with the teeth 24, 26 of the lower flanges 20, 22 of the reels 16, 18. Also, spring stops 92, 94, the function of which will be explained below, are formed adjacent the upper edges of the free ends 84a, 86a of the stopper members 84, 86.

A spring hold pin 96 is formed integrally with the base block 82 on the upper or top side thereof. (Although shown in the drawings as a single solid member, the pin 96 may be constructed in some other way. It may, for example, comprise a bifurcated pin made up of two or more cooperating elements.) A recess or hollow 98 is formed in the upper surface of the base block 82 around the spring hold pin 96.

A torsion spring 100, which comprises a coiled portion 102 having a pair of arms 104, 106 extending therefrom, is anchored to the spring hold pin 96 by virtue of the coiled portion 102 being fitted over the pin 96. The coiled portion 102 is received in the recess 98. The free ends of the arms 104, 106 fit under the spring stops, 92, 94, as can best be seen from FIG. 7 for the arm 104 and the spring stop 92, whereby the spring 100 is held in place with respect to the base block in such a manner as resiliently to urge the stopper members or arms 84, 86 away from one another. If desired, the spring hold pin 96 may extend upwardly sufficiently far to be received in a guideway defined by members 108 (only one of which is shown—in FIG. 7) formed integrally with the upper housing portion 12. This may assist in keeping the spring 100 in position and/or in guiding the sliding movement of the reel stopper 80 along the guideway 52.

Figure 5:
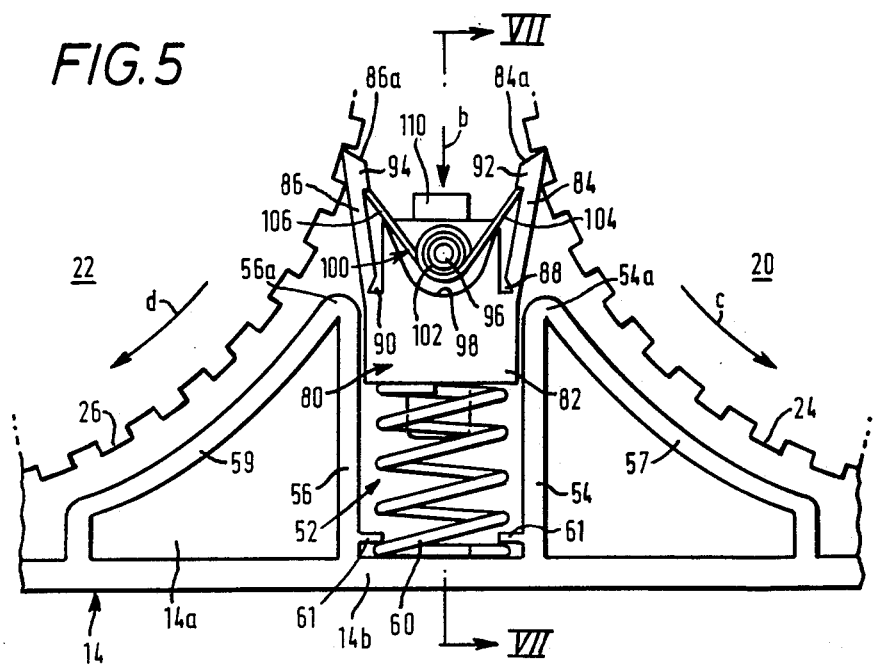
FIG. 5 is a plan view of the reel brake mechanism of FIG. 4, showing the mechanism in a reel locking position.

The reel stopper 80 is shown in its reel locking position in FIG. 5. The reel stopper 80 is urged into the locking position by the coil spring 60 and the position is defined by abutment of the base block 82 with a stop abutment 110 that protrudes above the bottom wall 14a of the housing lower portion 14. The free ends 84a, 86a of the stopper members 84, 86 are urged by the torsion spring 100 into engagement with the teeth 24, 26 on the peripheries of the lower flanges 20, 22 of the reels 16, 18, thereby to lock the reels in position.

Figure 6:
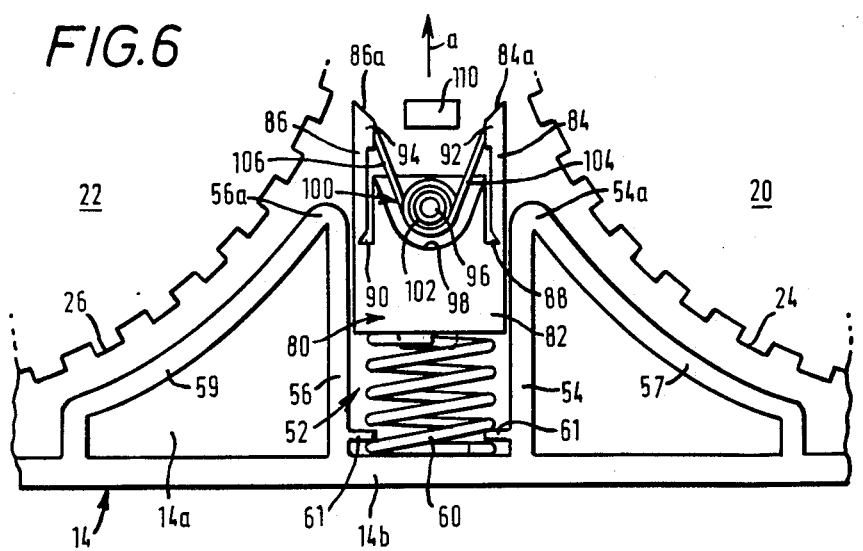
FIG. 6 is a plan view of the reel brake mechanism of FIG. 4, showing the mechanism in a position in which the reels are not locked (i.e. are released)
Figure 7:
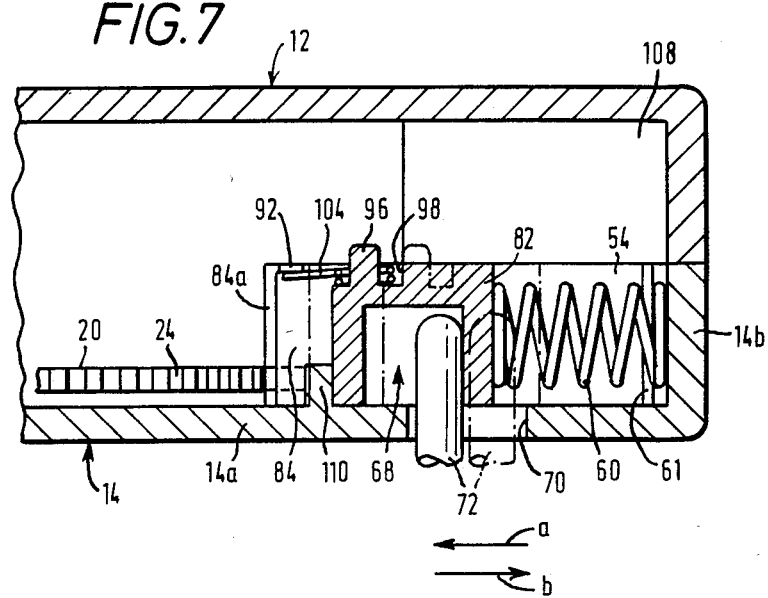
FIG. 7 is a sectional view taken along a line VII—VII in FIG. 5.
Figure 8:
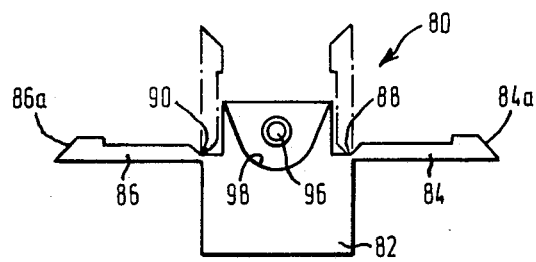
FIG. 8 is a plan view of a reel stopper of the reel lock mechanism of FIGS. 4 to 7.

When inserted into a recording and/or reproducing apparatus, the brake or lock mechanism of FIGS. 4 to 8 is released, in a similar manner to the mechanism of FIGS. 1 to 3 as described above, by a lock release pin 72 of the apparatus which extends into the recess 68 in the base block 82, via the cut-out or slot 70, and causes the base block to slide in the direction of the arrow b in FIGS. 5 and 7. The brake mechanism is thus moved from the locking position shown in FIG. 5, against the action of the coil spring 62, to the released position shown in FIG. 6. During this movement, abutment of the free ends 54a, 56a of the guide walls 54, 56 with the stopper members 54, 56, as the stopper members enter the guideway 52, causes the stopper members to pivot toward one another about their hinges (the thin portions 88, 90) until they adopt the relative orientation shown in FIG. 6. The free ends 84a, 86a of the stopper members 84, 86 are thus moved well clear of the teeth 24, 26 of the flanges 20, 22 of the reels 16, 18 whereby the reels 16, 18 are free to move.

The mechanism is returned from the position of FIG. 6 to the locked position of FIG. 5 by moving the lock release pin 72 in the direction of the arrow a in FIGS. 6 and 7 whereupon the coil spring 60 urges the reel stopper 80 in the direction a and the stopper arms 84, 86 open out to the positions shown in FIG. 5, under the action of the torsion spring 100, as the hinge portions 88, 90 emerge from the mouth of the guideway 52.

As will be appreciated from an inspection of FIG. 5, if, with the brake mechanism in the locked position, an attempt is made forcibly to rotate one or both of the reels 16, 18 in the direction of the arrows, the relatively thick and substantially rigid stopper members or arms 84, 86 will resist such movement and will not readily become bent or broken. Also, since the stopper members 84, 86 are substantially non-elastic and are hinged (rather than flexed) upon movement between the locking and released positions, and since they are biased into engagement with the teeth 24, 26 by the torsion spring 100 rather than by their inherent flexibility, operation of the present brake mechanism avoids the disadvantage of the previously proposed arrangement residing in the fact that operation of the mechanism can cause permanent deformation of the stopper members sufficient to cause them to fail to operate to lock the reels.

As indicated previously, the brake mechanism described above is designed specifically for incorporation in an 8 mm video cassette. However, the invention is more generally applicable to any kind of tape cassette for recording video and/or audio and/or other information.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A brake mechanism for a tape cassette having a cassette housing and a pair of tape reels on which a recording tape is wound, each tape reel being provided with a flange having teeth on an outer periphery thereof, the brake mechanism comprising:
    a base member slidable in a direction extending between said pair of tape reels;
    a spring hold pin provided on said base member;
    a pair of substantially rigid stopper members hinged on said base member and extending away from said base member for engaging said teeth of said flanges for braking purposes; and
    a spring anchored at said spring hold pin of said base member for urging said pair of stopper members toward said teeth of said flanges.

2. A brake mechanism according to claim 1, wherein said base member, said spring hold pin and said pair of stopper members are made of synthetic resin and are formed simultaneously by injection molding.

3. A brake mechanism according to claim 2, wherein each of said pair of stopper members has a thin portion forming a hinge joint with said base member.

4. A brake mechanism according to claim 3, wherein said pair of stopper members extend from respective sides of said base member.

5. A brake mechanism according to claim 1, wherein said spring is a torsion spring having a coiled portion and a pair of arms extending from said coiled portion, said coiled portion is anchored at said spring hold pin, and each of said pair of arms is engaged with a free end of a respective one of said stopper members.

6. A brake mechanism according to claim 1, wherein said stopper members are arranged to engage teeth on the outer peripheries of lower flanges of said tape reels.

7. A brake mechanism according to claim 1, wherein said spring hold pin is provided on the top of said base member.

* * * * *